(12) United States Patent
Dupeyre et al.

(10) Patent No.: US 11,859,513 B2
(45) Date of Patent: Jan. 2, 2024

(54) MOVING BLADE FOR A WHEEL OF A TURBINE ENGINE

(71) Applicant: SAFRAN AIRCRAFT ENGINES, Paris (FR)

(72) Inventors: Raphael Jean Philippe Dupeyre, Moissy-Cramayel (FR); Josserand Jacques Andre Bassery, Moissy-Cramayel (FR); Jeremy Jacques Attilio Fanelli, Moissy-Cramayel (FR); Etienne Leon Francois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 71 days.

(21) Appl. No.: 17/276,430

(22) PCT Filed: Sep. 13, 2019

(86) PCT No.: PCT/FR2019/052133
§ 371 (c)(1),
(2) Date: Mar. 15, 2021

(87) PCT Pub. No.: WO2020/058612
PCT Pub. Date: Mar. 26, 2020

(65) Prior Publication Data
US 2022/0034231 A1 Feb. 3, 2022

(30) Foreign Application Priority Data
Sep. 17, 2018 (FR) ........................... 1858340

(51) Int. Cl.
*F01D 5/22* (2006.01)
*F01D 5/30* (2006.01)
*F01D 11/12* (2006.01)

(52) U.S. Cl.
CPC ............... *F01D 5/225* (2013.01); *F01D 5/30* (2013.01); *F01D 11/122* (2013.01);
(Continued)

(58) Field of Classification Search
CPC ............. F01D 5/20; F01D 5/225; F01D 11/08
See application file for complete search history.

(56) References Cited

U.S. PATENT DOCUMENTS 11,215,116 B2 * 1/2022 Hiyama ..................... F01D 5/20
2014/0178201 A1 * 6/2014 Boeck ................... F01D 11/122
416/182

(Continued)

FOREIGN PATENT DOCUMENTS

DE 102010017489 A1 1/2011
EP 2746537 A1 6/2014
(Continued)

OTHER PUBLICATIONS

International Search Report and Written Opinion received for PCT Patent Application No. PCT/FR2019/052133, dated Feb. 3, 2020, 21 pages (9 pages of English Translation and 12 pages of Original Document).

*Primary Examiner* — David E Sosnowski
*Assistant Examiner* — Arthur Paul Golik
(74) *Attorney, Agent, or Firm* — WOMBLE BOND DICKINSON (US) LLP

(57) ABSTRACT

A moving blade for a wheel of an aircraft turbine engine, including an aerodynamic aerofoil and an outer heel defining the aerofoil. The heel includes a platform and a first lip that projects from the platform. The first lip is inclined upstream and peripherally along an axis of elongation. The heel includes a row of ribs that are arranged at a distance from each other. The row of ribs extends along the axis of elongation and from the platform up to the first lip. The ribs (Continued)

are arranged upstream of the first lip in such a way as to generate turbulence upstream of first lip.

12 Claims, 2 Drawing Sheets

(52) U.S. Cl.
 CPC .... *F05D 2240/127* (2013.01); *F05D 2240/80* (2013.01); *F05D 2250/182* (2013.01)

(56) References Cited

U.S. PATENT DOCUMENTS

| | | | |
|---|---|---|---|
| 2015/0023793 A1* | 1/2015 | Bensalah | F01D 5/30 416/193 A |
| 2015/0226070 A1* | 8/2015 | Plante | F01D 5/225 416/212 A |
| 2018/0010467 A1* | 1/2018 | Zhang | F01D 5/225 |

FOREIGN PATENT DOCUMENTS

| | | |
|---|---|---|
| FR | 2955142 A1 | 7/2011 |
| FR | 2970999 A1 | 8/2012 |

\* cited by examiner

MOVING BLADE FOR A WHEEL OF A TURBINE ENGINE

TECHNICAL FIELD

The present invention relates to the general field of movable vanes for a wheel of an aircraft turbomachine.

BACKGROUND

Classically, an axial turbine of a turbomachine comprises a succession of axial stages arranged one behind the other. Each stage comprises a moving wheel with vanes forming the rotor and a nozzle with vanes forming the stator. The wheel is rotated opposite the corresponding nozzle.

The moving wheel typically consists of an annular disc centred on the rotational axis Y of the wheel, to which a plurality of vanes are attached.

Traditionally, a movable vane comprises an aerodynamic blade extending along a stacking axis Z of the vane. The movable vane further comprises an outer heel and an inner root delimiting the blade along the stacking axis Z.

Specifically, the blade is bounded along the stacking axis Z by an outer platform of the heel and an inner platform of the root. The outer platform comprises at least one lip, e.g. two, protruding outward from the outer platform. The lips are intended to co-operate in a form-fitting manner with an annular block of abradable material (e.g. honeycomb structure) attached to an outer casing surrounding the moving wheel to form a dynamic labyrinth-type seal.

The purpose of the labyrinth-type seals is to limit the passage of gas between the moving wheel and the block of abradable material, i.e. to maximise the amount of gas acting on the blades of the moving wheel to maximise the efficiency of the turbine and the turbomachine in general.

In order to maximise efficiency, engine manufacturers therefore continually seek to minimise the passage of gas between the moving wheel and the block of abradable material.

The objective of the present invention is therefore to provide a simple, effective and economical solution to the above-mentioned problem.

DESCRIPTION OF THE INVENTION

The present invention provides a movable vane for a wheel of an aircraft turbomachine, said vane comprising an aerodynamic blade extending along a stacking axis Z and an outer heel delimiting said blade along said stacking axis Z, said heel comprising a platform and a first lip protruding from said platform, the first lip being inclined upstream at an acute angle to said stacking axis Z, said first lip extending circumferentially along an axis of elongation X, characterised in that the heel comprises a row of ribs spaced apart from each other, said row comprising at least two ribs, said row of ribs extending along said axis of elongation X, each rib extending along said stacking axis Z from said platform to said first lip, each rib being arranged upstream of the first lip according to the direction of gas flow around said blade so as to generate turbulence upstream of said first lip.

The ribs make it possible to create aerodynamic turbulence which form a curtain opposing the passage of gases from upstream to downstream, so as to limit the passage of gases between the moving wheel (respectively the movable vane) and the block of abradable material, and thus maximise efficiency.

The vane according to the invention may comprise one or more of the following characteristics, taken in isolation from each other or in combination with each other:

- at least one of the ribs is inclined at an acute angle A with respect to said axis of elongation X, said acute angle A being defined from the axis of elongation X to the corresponding rib in a trigonometric direction, said acute angle A being measured in a plane P perpendicular to said stacking axis Z;
- said acute angle A is greater than or equal to 30° and less than 90°;
- at least one of the ribs has a parallelogram-shaped profile cross-section, according to a cross-sectional plane perpendicular to said stacking axis Z and passing through the corresponding rib;
- each rib has two side walls, flat and parallel, said side walls being spaced apart from each other by a distance B, the distance B being between 0.5 and 3 mm, said distance B being measured in a plane P perpendicular to said stacking axis Z;
- said blade has an opposite intrados and extrados face, each rib having a flat front wall, said first lip having an outer surface delimited by a straight downstream edge and a straight side edge arranged on the side of the extrados face of the blade, the distance D between said downstream edge and said front wall being less than the length E of said side edge, the distance D and the length E being measured in a plane P perpendicular to said stacking axis Z;
- the distance C along said axis of elongation X between two consecutive ribs is between 2 and 5 mm, said distance C being measured in a plane P perpendicular to said stacking axis Z;
- said heel comprises a second lip spaced from said first lip and arranged downstream of said first lip.

The present invention further relates to a moving wheel for an aircraft turbomachine, comprising a disc carrying on its periphery an annular row of vanes as described above.

The present invention also relates to an aircraft turbomachine, comprising at least one vane as previously described or a wheel as previously described.

BRIEF DESCRIPTION OF FIGURES

The invention will be better understood and other details, characteristics and advantages of the invention will appear more clearly when reading the following description made as a non-limiting example and by reference to the annexed drawings in which.

DETAILED DESCRIPTION OF AN EMBODIMENT

Figure 1:
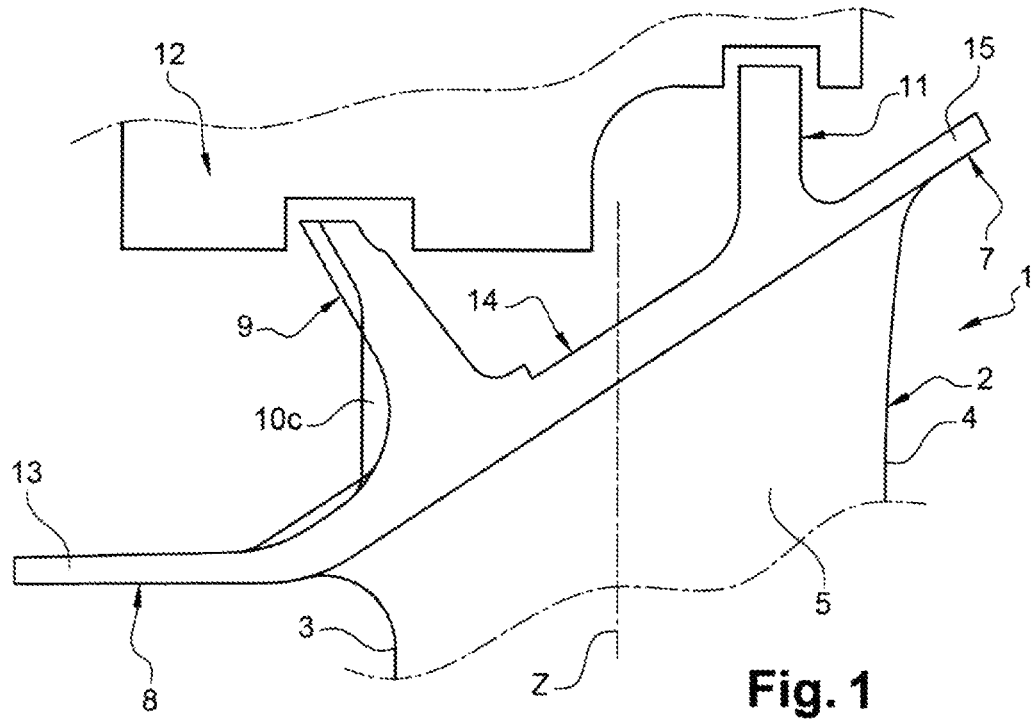
FIG. 1 is a schematic detail side view of a movable vane for a moving wheel of an aircraft turbomachine.
Figure 2:
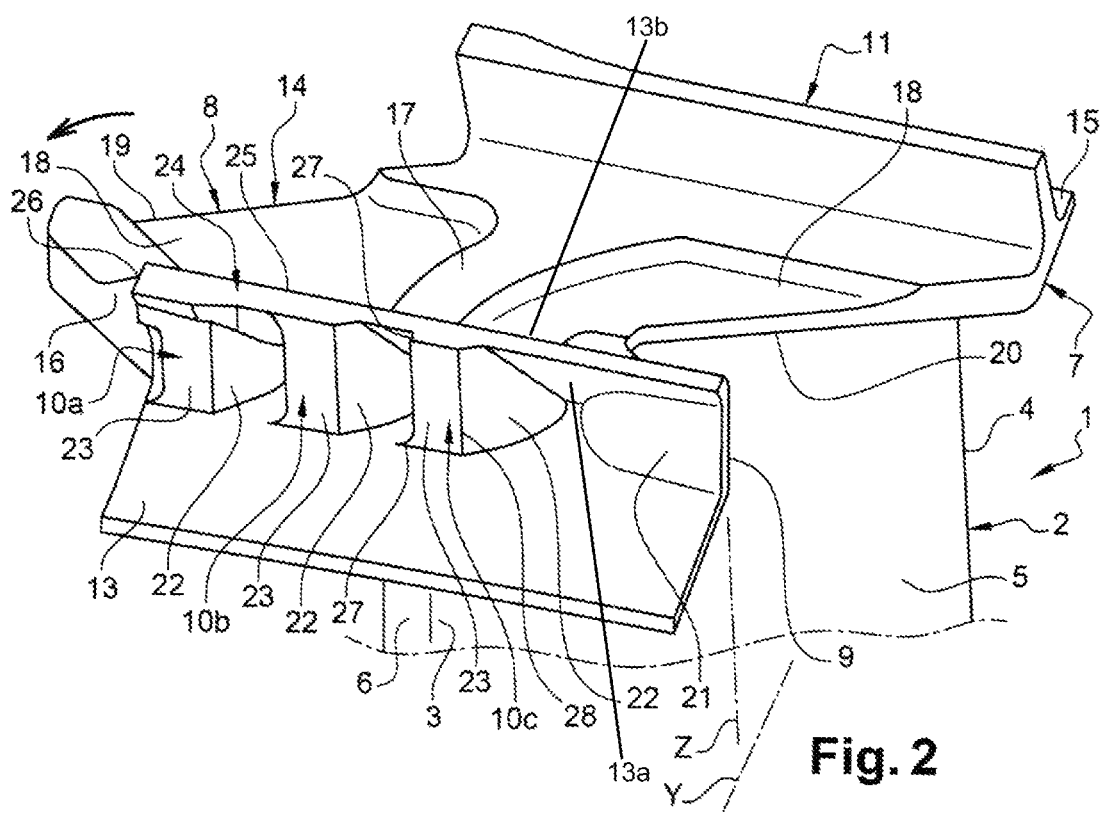
FIG. 2 is a perspective detail view of the vane shown in FIG. 1.
Figure 3:
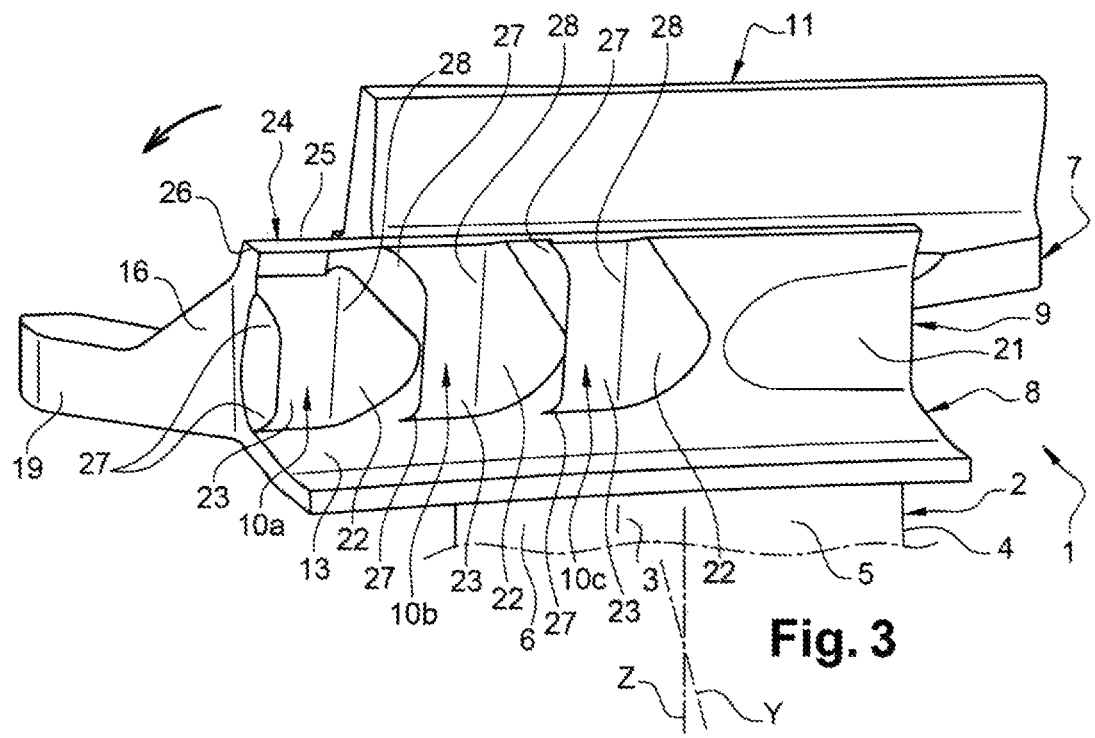
FIG. 3 is a perspective front view of the vane shown in FIGS. 1 and 2.

FIGS. 1 to 4 show a movable vane 1 for a moving wheel of an aircraft turbomachine, and more precisely for a moving wheel of a low-pressure turbine of the turbomachine. The movable vane 1 could be intended to equip a high-pressure turbine of the turbomachine.

The vane 1 comprises an aerodynamic blade 2 extending along a stacking axis Z. The blade 2 comprises a leading edge 3 and a trailing edge 4 opposite the leading edge 3. In addition, the blade 2 comprises an intrados side face 5 and an extrados side face 6 opposite to the intrados side face 5, with the intrados and extrados side faces 5, 6 connecting the leading edge 3 to the trailing edge 4. In a plane P perpendicular to the stacking axis Z, the blade 2 is profiled along a mean line connecting the leading edge 3 to the trailing edge 4, the mean line separating the vane 1 into an intrados side and an extrados side. The intrados and extrados faces 5, 6 are curved, and respectively concave and convex.

In the present application, the terms "intrados" and "extrados" associated with the different elements of the vane 1 refer to the intrados and extrados sides.

The leading edge 3 is positioned upstream of the trailing edge 4, according to the direction of gas flow around the blade 2, and generally following the direction of gas flow in the turbine.

In this application, the terms "upstream" and "downstream" are defined in relation to the direction of gas flow around the blade 2 (and more generally in the turbine).

The vane 1 also comprises an outer heel 7 and an inner root defining the blade 2 along the stacking axis Z. More precisely, the blade 2 is delimited by an inner platform of the root and an outer platform 8 of the heel 7.

A moving wheel comprises a disc with an annular row of vanes 1 on its periphery. Specifically, each root comprises a bulb configured to be engaged in a complementary recess in the disc. The wheel (respectively the vane 1) is mobile around an axis of rotation Y coaxial with the axis of the turbomachine. As shown by the arrow in FIGS. 2 and 3, the vane 1 is movable in rotation about the axis Y from the intrados to the extrados, and in other words here in a trigonometric (counterclockwise) direction of rotation.

In this application, the terms "inner", "outer", "internal" or "external" are defined in relation to the axis of rotation Y of the vane 1 (and more generally of the moving wheel).

The heel 7 of the vane 1 also comprises a first lip 9 protruding outwards from the outer platform 8. The first lip 9 is inclined upstream at an acute angle to the stacking axis Z. The first lip 9 extends circumferentially along an axis of elongation X. The heel 7 comprises a row of ribs 10a-10c spaced at a distance from each other. The row comprises at least two ribs 10a-10c. The row of ribs 10a-10c extends along the axis of elongation X. Each rib 10a-10c (or leaf) extends along the stacking axis Z from the outer platform 8 to the first lip 9. Each rib 10a-10c is arranged upstream of the first lip 9 according to the direction of gas flow around the blade 2 so as to generate turbulence upstream of the first lip 9.

According to the embodiment illustrated in the figures, the heel 7 of the vane 1 comprises a first lip 9 and a second lip 11 spaced apart from each other, the second lip 11 being located downstream of the first lip 9. The first lip 9 and the second lip 11 are hereinafter referred to as the upstream lip 9 and the downstream lip 11 respectively. The upstream lip 9 is inclined upstream at an angle of 30° to the stacking axis Z, the angle being measured in a plane which is both coincident with the rotational axis Y of the vane 1 and the stacking axis Z of the vane 1. The upstream lip 9 could be inclined upstream at an acute angle of between 25° and 35° to the stacking axis Z. The downstream lip 11 extends along the stacking axis Z from the outer platform 8. The downstream lip 11 could be inclined upstream at an angle of up to 10° to the stacking axis Z.

Tilting the lips 9 and 11 upstream increases the aerodynamic turbulence and thus strengthens the curtain formed by this turbulence, which opposes the passage of gases from upstream to downstream, so as to limit the passage of gas between the moving wheel (respectively the movable vane 1) and a block of abradable material 12.

According to the embodiment illustrated in the figures, the outer platform 8 of the vane 1 comprises, from upstream to downstream, an upstream spoiler 13 extending upstream of the upstream lip 9, an upstream surface 13a, an downstream surface 13b, a central plate 14 extending between the upstream lip 9 and the downstream lip 11, and a downstream spoiler 15 extending downstream of the downstream lip 11. The heel 7 also comprises two reinforcing tabs 16 between the upstream lip 9 and the plate 14, these tabs 16 being located at each end of the upstream lip 9. The plate 14 comprises a rib 17 centered on the mean line, with the rib 17 joining the upstream lip 9 to the downstream lip 11. The plate 14 also comprises two recesses 18 on either side of the rib 17.

The upstream and downstream lips 9, 11 are designed to co-operate in a form-fitting manner with an annular block of abradable material 12 (e.g. a honeycomb structure) attached to an outer casing surrounding the moving wheel to form a labyrinth-type seal.

The outer platforms of the movable vanes 1 of a same wheel are shaped to interlock with each other so as to externally delimit a portion of flowpath in which a gas stream flows. The outer platforms are thus arranged side by side. Each external platform 8 is delimited laterally by a male flank 19 able to fit into a female flank 20 of an adjacent vane and a female flank 20 able to receive a male flank 19 of an adjacent vane. The male and female flanks 19, 20 are respectively arranged on the extrados and intrados sides.

For example, the row comprises between two and five ribs.

According to the embodiment shown in the figures, the row comprises three ribs 10a-10c, referred as first rib 10a, second rib 10b and third rib 10c from the extrados to the intrados respectively. These three ribs 10a-10c are spaced apart from each other. The ribs 10a-10c are positioned at a constant pitch from the male flank 19 (extrados side). The first rib 10a is positioned close to the male flank 19. The third rib 10c is positioned away from the female flank 20. The heel 7 comprises a protrusion 21 between the third rib 10c and the female flank 20.

The upstream lip 9 extends circumferentially along an axis of elongation X. Advantageously, at least one of the ribs 10a-10c is inclined at an acute angle A to the axis of elongation X. The acute angle A is defined from the axis of elongation X to the corresponding rib 10a-10c in a trigonometric (or counterclockwise) direction. The acute angle A is measured in a plane P perpendicular to the stacking axis Z. The acute angle A is greater than or equal to 30° and less than 90°.

Figure 4:
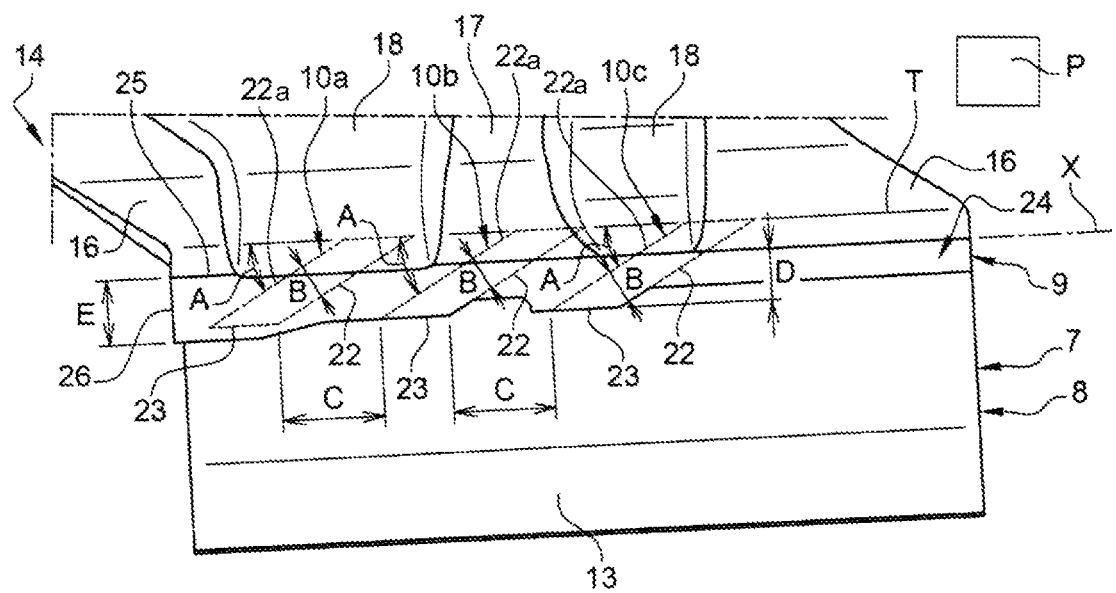
FIG. 4 is a top view of the vane illustrated in FIGS. 1 to 3, in a plane P perpendicular to a stacking axis Z of the vane, illustrating via a sketch the dimensional parameters of the ribs.

According to the embodiment illustrated in the figures, especially in FIG. 4, each of the three ribs 10a-10c is inclined at an angle of 30° (A=30°) with respect to the axis of elongation X. FIG. 4 is a top view on which the ribs 10a-10c are sketched in dotted lines. The construction line T shown in FIG. 4 corresponds to the origin of the upstream lip 9.

Advantageously, at least one of the ribs 10a-10c has a parallelogram-shaped cross-sectional profile in a sectional plane perpendicular to the stacking axis Z and passing through the corresponding rib 10a-10c.

According to the embodiment shown in the figures, in particular in FIG. 4, each of the three ribs 10a-10c has a parallelogram-shaped profile.

Advantageously, each of the ribs 10a-10c comprises two flat and parallel intrados side walls 22, the intrados side walls 22 being at a distance B from each other. The distance B is between 0.5 and 3 mm. The distance B corresponds to the thickness of the rib. The distance B is measured in a plane P perpendicular to the stacking axis Z. As shown in FIG. 4, front wall 23, opposite intrados side walls 22 are extrados side walls 22a.

According to the embodiment shown in the figures, especially in FIG. 4, the distance B is the same for all three ribs 10a-10c and is equal to 1 mm.

Advantageously, each of the ribs 10a-10c comprises a flat front wall 23. The upstream lip 9 comprises an outer surface 24 bounded by a straight downstream edge 25 and a straight side edge 26 arranged on the extrados side (hereafter referred to as the extrados side edge 26). The distance D between the downstream edge 25 and the front wall 23 is less than the length E of the extrados side edge 26. The distance D and the length E are measured in a plane P perpendicular to the stacking axis Z.

According to the embodiment shown in the figures, in particular in FIG. 4, the distance D is identical for the three ribs 10a-10c. The distance D is equal to 1.5 mm and the length E is equal to 2.5 mm. Each rib 10a-10c comprises, on the extrados side, a connecting fillet 27 with the upstream lip 9 and a connecting fillet 27 with the upstream spoiler 13. Each rib 10a-10c comprises a rounding 28 between the front wall 23 and the side wall 22 orientated on the intrados side.

Advantageously, the distance C along the axis of elongation X between two consecutive ribs 10a-10c is between 2 and 5 mm. The distance C is measured in a plane P perpendicular to the stacking axis Z.

According to the embodiment shown in the figures, especially in FIG. 4, the distance C is constant and equal to 3 mm.

According to the embodiment shown in the figures, the ribs 10a-10c have the same dimensional and geometrical characteristics. The dimensional and geometrical characteristics of each of the ribs may be different. The dimensional and geometrical characteristics of the ribs depend, among other things, on the predefined limit to the thermomechanical stress, the predefined limit to the mass of the vane and the integration of the vane.

In order to further limit the gas passage between the moving wheel (respectively the movable vane 1) and the block of abradable material 12, at least one rib can be installed upstream of the downstream lip 11. Such a rib extends along the stacking axis Z from the plate 14 to the downstream lip 11. Such a rib is configured to generate turbulence upstream of the downstream lip 11. The technical characteristics associated with the ribs 10a-10c of the upstream lip 9 are transposable to the ribs of the downstream lip 11.

The vane 1, for example, is produced using a method comprising, firstly, obtaining a raw foundry vane using a lost-wax casting process and, secondly, various machining operations carried out on the raw vane in order to obtain a vane 1 with final dimensions as detailed on the definition drawing.

The invention claimed is:

1. A movable vane for a wheel of an aircraft turbomachine, said vane comprising an aerodynamic blade extending along a stacking axis and an outer heel delimiting said blade along said stacking axis, said heel comprising a platform and an upstream lip and a downstream lip, the upstream and downstream lips protruding radially outward from said platform, the downstream lip being spaced from the upstream lip and being arranged downstream of the upstream lip, the upstream lip being inclined upstream at an acute angle to said stacking axis, said upstream lip extending circumferentially along an axis of elongation, wherein the heel comprises a row of ribs spaced from each other, said row comprising at least two ribs, said row of ribs extending along said axis of elongation, each rib extending along said stacking axis from said platform to said upstream lip, each rib being arranged upstream of the upstream lip according to the direction of gas flow around said blade so as to generate turbulence upstream of said upstream lip, wherein at least one of the ribs is inclined at an acute angle with respect to said axis of elongation, said acute angle being defined from the axis of elongation to a side wall of the corresponding rib, said acute angle being measured in a plane perpendicular to said stacking axis.

2. The vane according to claim 1, wherein said acute angle is greater than or equal to 30° and less than 90°.

3. The vane according to claim 1, wherein at least one of the ribs has a parallelogram-shaped profile cross-section, according to a cross-sectional plane perpendicular to said stacking axis and passing through the corresponding rib.

4. The vane according to claim 1, wherein each rib has two side walls, flat and parallel, said side walls being spaced apart from each other by a distance, the distance being between 0.5 and 3 mm, said distance being measured in a plane perpendicular to said stacking axis.

5. The vane according to claim 1, wherein said blade has an opposite intrados face and extrados face, each rib having a flat front wall, said upstream lip having an outer surface delimited by a straight downstream edge and a straight side edge arranged on the side of the extrados face of the blade, the distance between said downstream edge and said front wall being less than the length of said side edge, the distance and the length being measured in a plane perpendicular to said stacking axis.

6. The vane according to claim 1, wherein the distance along said axis of elongation between two consecutive ribs is between 2 and 5 mm, said distance being measured in a plane perpendicular to said stacking axis.

7. A moving wheel for an aircraft turbomachine, comprising a disc carrying on its periphery a vane according to claim 1.

8. An aircraft turbomachine comprising a vane according to claim 1.

9. The vane according to claim 1, wherein the upstream lip comprises an upstream surface, a downstream surface and a radially outer surface which connects the upstream surface to the downstream surface, wherein at least one of the ribs extends along said stacking axis from said platform to the radially outer surface of said upstream lip.

10. The vane according to claim 1, wherein the upstream lip comprises an upstream surface, a downstream surface and a radially outer surface which connects the upstream surface to the downstream surface, wherein each rib comprises two side walls connected to each other by a flat front wall, wherein the flat front wall of at least one of the ribs extends along said stacking axis from said platform to the radially outer surface of said upstream lip.

11. The vane according to claim 1, wherein said blade has an intrados face and an extrados face which are opposite,
   wherein each rib comprises an intrados side wall which is arranged on a side of the intrados face of the blade and an extrados side wall which is arranged on a side of the extrados face of the blade,
   wherein each rib is inclined at an acute angle with respect to said axis of elongation, said acute angle being defined from the axis of elongation to the extrados side wall of the corresponding rib, said acute angle being measured in a plane perpendicular to said stacking axis.

12. The vane according to claim 11, wherein the acute angle is identical for all the ribs.

* * * * *